US012227605B2

(12) United States Patent
Reichelt (10) Patent No.: US 12,227,605 B2
(45) Date of Patent: Feb. 18, 2025

(54) HIGH MELT STRENGTH POLYPROPYLENE

(71) Applicant: BOREALIS AG, Vienna (AT)

(72) Inventor: Norbert Reichelt, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/559,450

(22) PCT Filed: May 12, 2022

(86) PCT No.: PCT/EP2022/062865
§ 371 (c)(1),
(2) Date: Nov. 7, 2023

(87) PCT Pub. No.: WO2022/238520
PCT Pub. Date: Nov. 17, 2022

(65) Prior Publication Data
US 2024/0228685 A1    Jul. 11, 2024

(30) Foreign Application Priority Data

May 12, 2021    (EP) ..................... 21173666

(51) Int. Cl.
*C08F 255/02*    (2006.01)
*C08J 3/20*    (2006.01)
*C08J 3/28*    (2006.01)
*C08K 5/09*    (2006.01)

(52) U.S. Cl.
CPC .............. *C08F 255/02* (2013.01); *C08J 3/203* (2013.01); *C08J 3/28* (2013.01); *C08K 5/09* (2013.01); *C08J 2351/06* (2013.01)

(58) Field of Classification Search
CPC .......... C08L 23/10; C08L 23/12; C08L 23/14; C08L 2312/06; C08L 2207/07; C08L 2207/20; C08F 10/06; C08F 210/06; C08F 225/02; C08G 110/06
See application file for complete search history.

(56) References Cited

U.S. PATENT DOCUMENTS

| | | |
|---|---|---|
| 2,948,666 A | 8/1960 | Lawton |
| 4,916,198 A | 4/1990 | Scheve et al. |
| 5,047,446 A | 9/1991 | Denicola, Jr. |
| 5,411,994 A | 5/1995 | Galli et al. |
| 5,414,027 A | 5/1995 | Denicola, Jr. et al. |
| 5,554,668 A | 9/1996 | Scheve et al. |
| 5,605,936 A | 2/1997 | Denicola, Jr. et al. |
| 6,632,854 B1 | 10/2003 | Charlier |
| 6,699,919 B1 | 3/2004 | Charlier |
| 7,019,044 B2 | 3/2006 | Debras et al. |
| 7,935,740 B2 | 5/2011 | Dang et al. |
| 8,399,536 B2 | 3/2013 | Abata et al. |

FOREIGN PATENT DOCUMENTS

| | | |
|---|---|---|
| CA | 2198651 A1 | 8/1997 |
| CN | 102477202 A | 5/2012 |
| CN | 110804135 A1 | 2/2020 |
| EP | 0190889 B2 | 11/1986 |
| EP | 0351866 B2 | 4/1992 |
| EP | 0451804 B2 | 9/1992 |
| EP | 0519341 B2 | 12/1992 |
| EP | 0519386 B2 | 12/1992 |
| EP | 0520773 B1 | 3/1993 |
| EP | 0634441 B2 | 1/1995 |
| EP | 0678527 B2 | 1/1996 |
| EP | 0799839 B2 | 10/1997 |
| EP | 0821018 A2 | 1/1998 |
| EP | 0787750 B2 | 5/1998 |
| EP | 1170306 A1 | 1/2002 |
| EP | 1187860 A1 | 3/2002 |
| EP | 1297031 B1 | 4/2003 |
| JP | 8301946 A | 11/1996 |
| JP | 2011105863 A | 6/2011 |
| JP | 2018504486 A | 2/2018 |
| KR | 1020060113988 | 11/2006 |
| RU | 2605398 C2 | 12/2016 |
| RU | 2708857 C2 | 12/2019 |
| WO | 1997/08216 A1 | 3/1997 |
| WO | 2000/056793 A1 | 9/2000 |
| WO | 2001/088001 A1 | 11/2001 |
| WO | 2017/068106 A1 | 4/2017 |
| WO | 2018/028922 A1 | 2/2018 |

OTHER PUBLICATIONS

H.N. Cheng, "13C NMR Analysis of Ethylene-Propylene Rubbers", Macromolecules 1984, 17, 1950-1955.
Kakugo, Masahori, et al., 13C NMR Determination of Monomer Sequence Distribution in Ethylene-Propylene Copolymers Prepared with d-TiCl3—Al(C2H5)2CI, Macromolecules 1982, 15, 1150-1152.
Resconi, Luigi, et al. "Selectivity in Propene Polymerization with Metallocene Catalysts" Chem Rev. 2000, 100, 1253-1345.
Vincent Busico, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Vincent Busico, et al., "Full Assignment of the 13C NMR Spectra of Regioregular Polypropylenes: Methyl and Methylene Region", Macromolecules 1997, 30, 6251-6263.
Vincent Busico, et al., "Microstructure of polypropylene" Prog. Polym. Sci 26 (2001) 443-533.
Wen-Jun Wang, et al., "Structural Analysis of Ethylene/Propylene Copolymers Synthesized with a Constrained Geometry Catalyst" Macromolecules 2000, 33, 1157-1162.
Zhe Zhou, et al., "A new decoupling method for accurate quantification of polyethylene copolymer composition and triad sequence distribution with 13C NMR" Journal of Magnetic Resonance 187 (2007) 225-233.

(Continued)

*Primary Examiner* — John M Cooney
*Assistant Examiner* — Jeffrey S Lenihan
(74) *Attorney, Agent, or Firm* — Tarolli, Sundheim, Covell & Tummino LLP (57) ABSTRACT

The present invention is related to a high melt strength polypropylene (HMS-PP) comprising units derivable from at least one polyunsaturated fatty acid, a process for preparing said high melt strength polypropylene (HMS-PP), as well as an article comprising said high melt strength polypropylene (HMS-PP).

13 Claims, 1 Drawing Sheet

(56) References Cited

OTHER PUBLICATIONS

Zweifel, Hans, Plastics Additives Handbook, 5th Edition, 2001, 956-965.
E-L. Heino, et al., "Rheological Characterization of Polyethylene Fractions" Theoretical and Applied Rheology, Aug. 17-21, 1992, pp. 360-362.
Eeav-Leena Heino, "The Influence of molecular structure on some rheological properties of polyethylene" Annual transactions of the Nordic Rheology Society, vol. 3, 1995.
Definition of Terms relating to the non-ultimate mechanical properties, Pure & Appl. Chem., vol. 70, No. 3, pp. 701-754, 1998.
European Application No. 21173666.5, Search Report dated Oct. 1, 2021.
Zweifel, Hans, Plastic Additives Handbook, 6th edition, 2009, p. 1141-1190.
Huang, H. Melt grafting of a long-chain unsaturated carboxylic acid onto polypropylene, Reactive & Functional Polymers 50 (2001) 49-55.
Resconi, Luigi, Highly Regiospecific Zirconocene Catalysts for the Isospecific Polymerization of Propene, J. Am. Chem. Soc. 1998, 120, 2308-2321.
Wagner, M. H. Rheotens-Mastercurves and Drawability of Polymer Melts, Polymer Engineering and Science, Mid-Apr. 1996, vol. 36, No. 7.
Taiwan Application No. 111117817 Examination Report dated Jan. 5, 2023.
1st Edition. Plastics Determination of Drawing Characteristics of Thermoplastics in the Molten State, International Standard—ISO, Zuerich, CH, Jun. 15, 2005, pp. 1-16.
Ratzsch, M. Polypropylene Foams, Springer 1999, pp. 635-642.
Moore, Edward P. Polypropylene Handbook, 1996, Water Quenched Blown Film, 330-331.
Liao, Yiqun, Simultaneous Detection, Genotyping, and Quantification of Human Papillomaviruses by Multicolor Real-Time PCR and Melting Curve Analysis, Journal of Clinical Microbiology, Feb. 2013, vol. 51, No. 2, p. 429-435.
Singh, Gurmeet, Triad Sequence Determination of ethylene-propylene copolymers—application of quantitative 13C NMR, Polymer Testing 28 (2009) 475-479.
Korean Application No. 10-2023-7042211, Notice of Allowance dated Mar. 29, 2024.
Russian Application No. 2023132010/04, Office Action dated Oct. 15, 2024.
Japanese Application No. 20203-568550, Office Action dated Dec. 10, 2024.

HIGH MELT STRENGTH POLYPROPYLENE

The present invention is related to a high melt strength polypropylene (HMS-PP) comprising units derivable from at least one polyunsaturated fatty acid, a process for preparing said high melt strength polypropylene (HMS-PP) as well as an article comprising said high melt strength polypropylene (HMS-PP).

In case propylene-based polymer compositions are applied to form shaped objects, it is necessary that the compositions have a sufficiently high melt strength to be able to mould the compositions into the desired shape. This is for example the case when propylene-based polymer compositions are shaped into objects via processes in which the composition is heated to above its melt temperature and subsequently shaped into the desired objects. In such process, a high shape stability is required of the propylene-based polymer composition at that temperature at which the object is shaped. The propylene-based polymer composition needs to be able to maintain its shape in the molten situation under such temperature conditions prior to solidification by cooling taking place. Such objects to be prepared using propylene-based polymer compositions may for example include foam structures.

A common method for the production of foam structures using propylene-based polymer compositions, as described in "Polypropylene foams", Ratzsch et al., Springer, 1999, DOI: 0.007/978-94-01-4421-6-86, p. 635-642, is a process comprising the steps of:
  (i) bringing the propylene-based polymer composition in a molten condition;
  (ii) introducing pockets of gaseous material into the molten propylene-based polymer composition to form a molten propylene-based polymer composition comprising foam cells;
  (iii) moulding the molten propylene-based polymer composition comprising foam cells into the desired shape comprising a foam structure; and
  (iv) solidifying the shaped foam structure by cooling to below the melting point of the propylene-based polymer composition.

Generally, these steps are conducted in the presented order. A critical element in this process is the formation of the foam cells in step (ii). Depending on the nature of the processed material, the foam structure may comprise a certain quantity of closed cells. In the context of the present invention, closed cells may be understood to be pockets of gaseous material that are on all sides surrounded by closed cells walls, such that the gaseous material in each cell is not in contact with the gaseous material in another cell. Such cell walls may for example comprise the propylene-based polymer composition.

For certain applications, it is desirable that the foam structure comprises a certain high fraction of closed cells. A high fraction of closed cells may contribute to the thermal insulation value of a foamed structure. Furthermore, a high fraction of closed cells may contribute to the strength of a foamed structure such as in terms of flexural modulus and tensile strength. Furthermore, it is desirable that these foam structures have a certain low density. For example, the density of the foam structures may be equal or below 100 kg/m$^3$, alternatively equal or below 80 kg/m$^3$. Foam structures having such low density comply with requirements of weight reduction for applications such as meat or fruit trays.

Another important characteristic is that the temperature range in which foam structures having such desired high fraction of closed cells and having such desired low density may be produced by extrusion foam production methods is sufficiently broad. This temperature range is also referred to as the foamability window. Preferably, the foamability window is equal or above 5° C. If the foamability window is too narrow, this presents a significant burden on the foam processing equipment, as fluctuations in processing temperature need to be avoided. Fluctuations beyond the foamability window of a material to be foamed may lead to off-spec material which is unsuitable to be sold commercially for reasons of not meeting the quality requirements.

In order to achieve the above properties, the propylene-based polymer composition needs to have a sufficiently high melt strength. The melt strength represents an indication of the extent to which the individual polymeric molecules manage to maintain their positions towards each other under conditions where the polymer composition is in a molten state.

A high melt strength polypropylene is branched and, thus, differs from a linear polypropylene in that the polypropylene backbone covers side chains whereas a non-branched polypropylene, i.e. a linear polypropylene, does not cover side chains. It is known that such long chain branching drastically modifies the rheological behavior of the polypropylene, for example the elongational and shear viscosity.

Three main routes are known to produce branched polypropylenes having the properties required for low density foam in commercial scale:
  A. Irradiation of polypropylene without coupling agent/sensitizer;
  B. Reactive extrusion of polypropylene using a low temperature peroxide/peroxicarbonate alone or in combination with a coupling agent;
  C. Polymerization of propylene and oligomers using special catalysts.

Route B has drawbacks originating from either addition of peroxide as radical source or coupling agent. The drawbacks of route C originate from the special catalyst and special polymerization conditions required as well as small production volumes compared to typical size of commercial polymerization reactors.

Route A is the most preferred route in respect of product purity but securing the product quality in irradiation processes is challenging, as the active macroradicals tend to start visbreaking reactions.

EP 0 190 889 discloses a process to produce branched polypropylene by irradiation of PP flakes under reduced oxygen in presence of low level of antioxidants without coupling agent. The dose range is disclosed as being from 0.1 to 1000 kGy/min and it is disclosed that the ionizing radiation should have sufficient energy to penetrate to the extent desired in the mass of linear propylene polymer material being radiated. There is also disclosed the use of an accelerating potential (for an electron generator) of 500 to 4000 kV and dose of 10 to 90 kGy. Following the irradiation step the irradiated material is heated in an extruder to deactivate the macroradicals.

EP 0 519 386 and EP 0 634 441 disclose a process similar to EP 0 190 889 for making a high melt strength propylene polymer and copolymers by high energy radiation of polypropylene flakes containing antioxidants. U.S. Pat. Nos. 5,047,446 and 4,916,198 disclose a production process similar to EP 0 190 889 emphasizing two thermal deactivation steps after the irradiation.

EP 0 678 527 (Chisso 1995) discloses a process for producing a modified polypropylene in which polypropylene and a crosslinking agent mixture are irradiated with ionizing radiation so as to give an absorbed dosage of 1 to 20 kGy, with subsequent heat treating of the resultant material.

WO 97/08216 discloses a method for producing diene modified propylene polymers which are irradiated. It is disclosed that the irradiation is preferably carried out using E-beam or gamma radiation at a dose of about 1 to about 20 Mrad for a few seconds. It is disclosed that polypropylene can be copolymerized with a diene using a metallocene catalyst and then irradiated to cause chain extension.

EP 0 799 839 and EP 0 351 866 also have similar disclosures as EP 0 634 441 and disclose the use of an electron generator having accelerating potential of 500 to 4000 kV.

EP 0 451 804 discloses a method of increasing the molecular weight of syndiotactic polypropylene by irradiation in the absense of oxygen. This specification does not disclose any energy range for the irradiation. The dose of the irradiation may be from 0.1 to 50 Mrad. After irradiation, the polypropylene may be heated.

EP 0 787 750 discloses a process to produce branched polypropylenes by irradiation in the presence of branching agents such as butadiene or diacrylates at a dose between 2 and 8 Mrd.

U.S. Pat. No. 5,554,668 discloses a process for irradiating polypropylene to increase the melt strength thereof. An increase in the melt strength is achieved by decreasing the melt flow rate, otherwise known as the melt index. It is disclosed that a linear propylene polymer material is irradiated with high energy ionizing radiation, preferably an electron beam, at a dose rate in the range of from about 1 to $1 \times 10^4$ Mrads per minute for a period of time sufficient for a substantial amount of chain scission of the linear propylene polymer molecule to occur but insufficient to cause gelation of the material. Thereafter, the material is maintained for a period of time sufficient for a significant amount of long chain branches to form. Finally, the material is treated to deactivate substantially all free radicals present in the irradiated material. It is disclosed that for an electron beam, the electrons are beamed from an electron generator having an accelerating potential (i.e. an energy) of from 500 to 4000 kV. Typically, the polypropylene material to be irradiated is in particulate form and is conveyed on a conveyor belt beneath an electron beam generator which continuously irradiates the polypropylene particles as they are translated thereunder by the conveyor belt. The resultant polypropylene has improved melt strength as represented by a decrease in the melt flow rate. A disadvantage of the process disclosed in U.S. Pat. No. 5,554,668 is that the production rate of the irradiated polypropylene is relatively low, because the speed of the conveyor belt is low and only a small volume of material is processed. This results in difficulties in commercial implementation of the process. In addition, the specification discloses the use of a very broad range of dose rates i.e. from 1 to $1 \times 10^4$ Mrads per minute. High dose rates of greater than about 40 Mrad can result in a substantially fully crosslinked structure of the polypropylene. Such a high crosslinked structure, however, is difficult to process.

Several attempts were made to find a process to produce branched polypropylene by irradiation of pellets as the handling of polypropylene powder has several disadvantages in logistics and safety risk of dust explosions.

EP 0 520 773 discloses an expandable polyolefin resin composition including polypropylene optionally blended with polyethylene. In order to prepare a crosslinked foam, a sheet of expandable resin composition is irradiated with ionizing radiation to crosslink the resin. The ionizing radiation may include electron rays at a dose of from 1 to 20 Mrad. It is disclosed that auxiliary crosslinking agents may be employed which include a bifunctional monomer, exemplified in EP 1 297 031 by 1,9-nonanediol dimethacrylate.

EP 0 519 341 discloses the grafting of vinyl monomers on particulate olefin polymers by irradiating the polymer and treating with a grafting monomer. In an example, polypropylene is irradiated with an electron beam having an energy of 2 MeV and subsequently treated with maleic anhydride as a grafting monomer.

U.S. Pat. No. 4,916,198 discloses the radiation of polypropylene powder and the addition of additives after irradiation. Polypropylene granulate and the use of linseed oil are not disclosed.

U.S. Pat. No. 5,414,027 also discloses electron beam irradiation of a propylene polymer, but not the use of linseed oil as stabilizer.

U.S. Pat. Nos. 2,948,666 and 5,605,936 disclose processes for producing irradiated polypropylene. The latter specification discloses the production of a high molecular weight, non-linear propylene polymer material characterized by high melt strength by high energy irradiation of a high molecular weight linear propylene polymer. It is disclosed that the ionizing radiation for use in the irradiation step may comprise electrons beamed from an electron generator having an accelerating potential of 500 to 4000 kV. For a propylene polymer material without a polymerized diene content, the dose of ionizing radiation is from 0.5 to 7 Mrad. For propylene polymer material having a polymerized diene content, the dose is from 0.2 to 2 Mrad.

EP 0 821 018 discloses the preparation of crosslinkable olefinic polymers which have been subjected to ionizing radiation. The specification exemplifies electron beams of relatively low energy and low doses to split polymeric chains in order to graft silane derivatives onto the polymeric chain. The specification does not address the problem of achieving high melt strength of polymers.

U.S. Pat. No. 5,411,994 discloses the production of graft copolymers of polyolefins in which a mass of olefin polymer particles is irradiated and thereafter the mass is treated with a vinyl monomer in liquid form. The ionizing radiation dose is about 1 to 12 Mrad and the ionizing radiation preferably comprises electrons beamed from an electron generator having an accelerating potential of 500 to 4000 kV. The polymer is first irradiated and then treated with a grafting agent.

It is further known that when irradiating isotactic polypropylene, which has been produced using conventional Ziegler-Natta catalysts, the irradiation of the polypropylene with an electron beam produces free macroradicals and there is a competition between chain scission and branching which is in favour of chain scission.

It is known to use branching agents, for example multivinylic compounds, to displace the equilibrium towards the achievement of branching. For example, CA 2 198 651 discloses that bifunctional, unsaturated monomers can be added before and/or during the irradiation. Such compounds may include divinyl compounds, alkyl compounds, dienes or mixtures thereof. These bifunctional, unsaturated monomers can be polymerized with the help of free radicals during the irradiation. Butadiene is particularly preferred. CA 2 198 651 also discloses a continuous method for producing polypropylene mixtures of increased stress-crack resistance and melt strength in which a low-energy electron beam accelerator with an energy of from 150 to 300 keV at a radiation dose of 0.05 to 12 Mrads is employed. This process also suffers from the disadvantage that the production rate of the irradiated powder can be somewhat low for commercial acceptance. Moreover, the polypropylene powder to be irradiated must be in the form of very fine particles. It is also known to irradiate copolymers of propylene and dienes, for example 1,5-hexadiene. The use of such copolymer complicates substantially the polymerization procedure due to incomplete conversion of the dienes and corresponding odor.

WO 01/88001 discloses a process to prepare branched polypropylene by irradiation in presence of crosslinking promoting gas as butadiene and acetylene.

U.S. Pat. No. 7,019,044 and EP 1 297 031 disclose a process to prepare branched polypropylene by irradiation of a propylene copolymer with double bonds >0.1/10000 carbon atoms.

EP 1 187 860 and EP 1 170 306 disclose a similar process as EP 0 787 750 by irradiation with e-beam having an acceleration voltage >5 MeV in presence of branching agent such as acrylates, diacrylates, butadiene and tetravinylsilane.

U.S. Pat. Nos. 7,935,740 and 8,399,536 disclose a process to produce polypropylenes with high melt strength by irradiation of polypropylene pellets containing at least one non phenolic antioxidant such as phosphite, HALS, benzofuranones, hindered amines, hydroxylamines, and others.

WO 2018/028922 (Sabic) discloses process to produce polypropylene with high melt strength by irradiation of polypropylene pellets containing only Vitamin E.

Multiple unsaturated branching agents have been disclosed for polypropylene to reach the required level of branching without formation of gels at low dose. These substances are employed to stabilize the macroradicals formed by abstraction of hydrogen from the polypropylene chain by high energy irradiation to form a branched structure by combination. Typical sensitizers are very reactive unsaturated chemical compounds such as acrylates, di- and triacrylates, conjugated dienes such as butadiene, acetylene or vinyl compounds such as tetra vinylsilane or divinylbenzol.

The use of such branching (or grafting or sensitizing) agents commonly leads to the disadvantage of unpleasant smell, increased cost and increased possibility of environmental problems, in particular toxicity, as a result of unreacted branching or grafting agent in the modified polypropylene. Another common problem of all these proposed substances is a potential migration of unreacted branching agent out of the polymer or foam made from the polymer into the environment.

A general problem connected to the extrusion foaming of long chain branched polypropylene is the change of viscosity and melt strength caused by shear during extrusion. This change of viscosity creates problems for the use re pelletized PP foam production waste in the foaming process as second component. The different melt strength and viscosity of the high melt strength polypropylene recyclate to virgin high melt strength polypropylene resin limit the maximal addition level to 20 to 30 wt % for the production of very low density foams.

Preferably, all substances (branching agent and antioxidants) used in that polypropylene composition should originate from a renewable source and should generally be recognized as safe (GRAS) or food approved to be used in polypropylene compositions, as food packaging is one of the main applications for branched polypropylene.

The present invention aims to provide polypropylene resins, having improved properties, in particular improved melt strength, which can be manufactured at a high production rate using a branching agent from a renewable source.

Accordingly, the present invention is directed to a high melt strength polypropylene (HMS-PP), having a branching index g' determined according to GPC below 0.9 and comprising units derivable from
i) propylene, and
ii) at least one polyunsaturated fatty acid.

The present invention is further directed to a process for the preparation of a high melt strength polypropylene (HMS-PP), comprising the steps of
a) providing a linear propylene polymer (L-PP),
b) blending said propylene polymer (L-PP) with a coupling agent (CA) comprising a polyunsaturated fatty acid, and
c) irradiating the mixture obtained in step b) by means of electron beam irradiation.

Further, the present invention is directed to a high melt strength polypropylene (HMS-PP) obtained from said process.

The present invention is also directed to a foam, comprising the high melt strength polypropylene (HMS-PP) as described above.

The present invention is further directed to a composition (C), comprising at least 10.0 wt %, based on the overall weight of the composition (C), of recycled high melt strength polypropylene (r-HMS-PP), being high melt strength polypropylene (HMS-PP) as described above, which is recovered from a waste plastic material derived from post-consumer and/or industrial waste.

Finally, the present invention is directed to an article, comprising the high melt strength polypropylene (HMS-PP) as described above.

Preferred embodiments of the invention are described in the dependent claims.

In the following, the present invention is described in more detail.

As indicated already above, the present invention is directed to a high melt strength polypropylene (HMS-PP), having a branching index g' determined according to GPC below 0.9 and comprising units derivable from
i) propylene, and
ii) at least one polyunsaturated fatty acid.

The branching index g' defines the degree of branching and correlates with the amount of branches of a polymer. Preferably, the high melt strength polypropylene according to the present invention has a branching index g' determined according to GPC equal to or below 0.85, more preferably equal to or below 0.80.

The branching index g' of the high melt strength polypropylene according to the present invention will be usually at least 0.10.

The invention is directed to a high melt strength polypropylene (HMS-PP) comprising units derivable from a polyunsaturated fatty acid. Said high melt strength polypropylene (HMS-PP) is prepared by irradiating a linear polypropylene precursor in the presence of a polyunsaturated fatty acid. The latter is preferably obtained from a natural source. Therefore, the present invention is characterized in that a high melt strength polypropylene (HMS-PP) can be obtained by using a renewable substance such a vegetable oil comprising a high amount of polyunsaturated fatty acids and irradiation by electron beam radiation.

The inventors have unexpectedly found that a high melt strength polypropylene (HMS-PP) comprising units derivable from a polyunsaturated fatty acid is well suited to:
limit the MFR change during extrusion of linear polypropylene (fluff and pellets) having a fractional MFR;

create the long chain branching and high additional high melt strength of polypropylene by electron beam irradiation;

limit the change of viscosity and melt strength of long chain branched polypropylene caused by shear during extrusion.

As used herein, the term "polyunsaturated fatty acid" refers to a fatty acid comprising at least two carbon-carbon double bonds. Preferably, the inventive high melt strength polypropylene (HMS-PP) comprises units derivable from a bifunctionally unsaturated fatty acid, i.e. a polyunsaturated fatty acid comprising two carbon-carbon double bonds.

It is preferred that the high melt strength polypropylene (HMS-PP) comprises at least 0.05 wt %, more preferably 0.05 to 2.0 wt %, still more preferably 0.1 to 1.0 wt %, like 0.25 to 0.5 wt % of units derivable from at least one polyunsaturated fatty acid based on the overall weight of the high melt strength polypropylene (HMS-PP).

It is especially preferred that the at least one polyunsaturated fatty acid, like the bifunctionally unsaturated fatty acid, is linoleic acid and/or α-linolenic acid.

Figure 1:
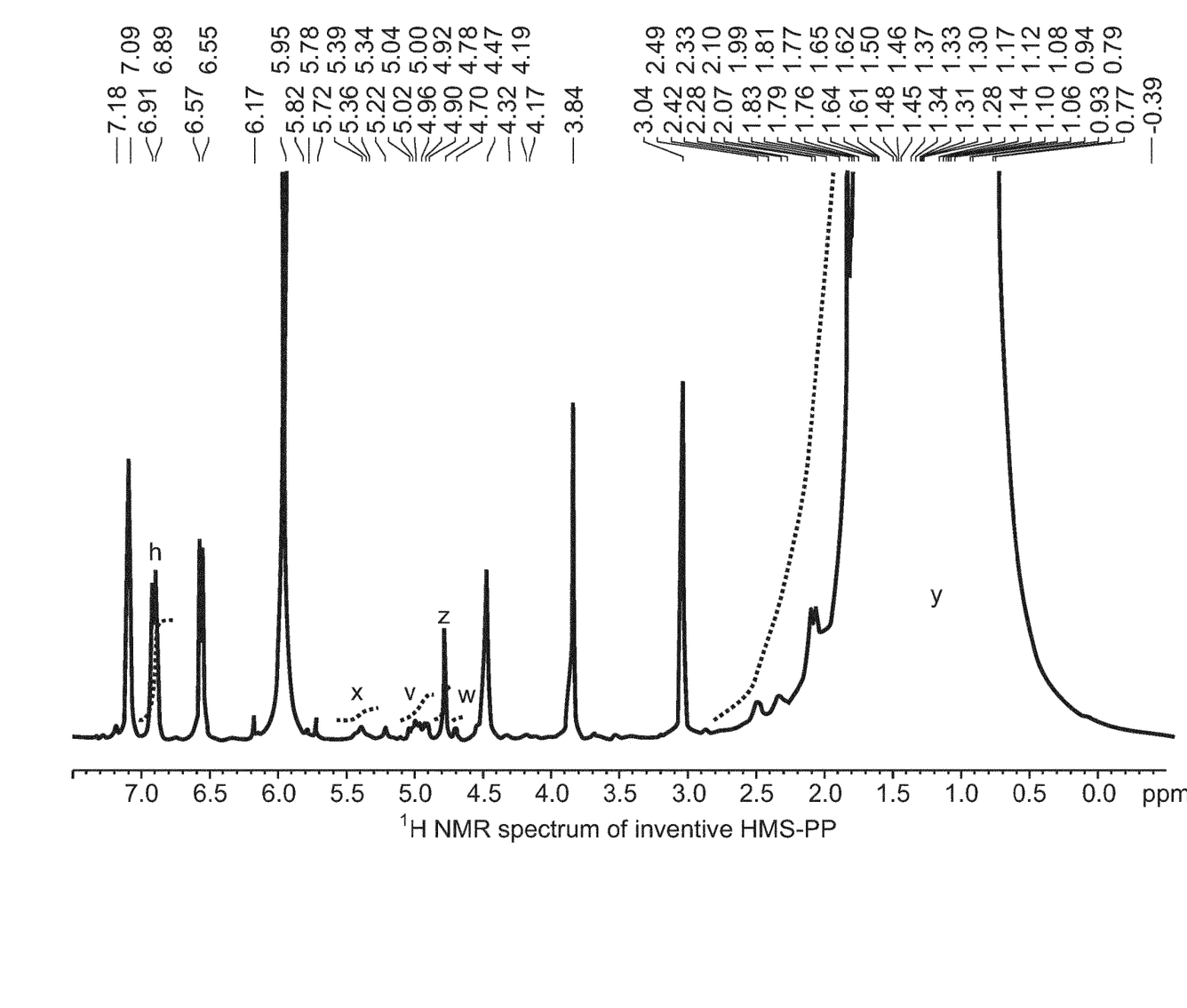

The presence of units derivable from α-linolenic acid and/or other polyunsaturated vegetable oils within the high melt strength polypropylene (HMS-PP) can be detected by means of $^1$H NMR spectroscopy. In particular, it is preferred that the ratio x/(z-w) is in the range of 0.25 to 2.0, wherein x is the intensity of the $^1$H NMR signal (400 MHz, 1,2-tetrachloroethane-$d_2$) at 5.55 to 5.27 ppm, z is the intensity of the $^1$H NMR signal (400 MHz, 1,2-tetrachloroethane-$d_2$) at 4.85 to 4.73 ppm and w is the intensity of the $^1$H NMR signal (400 MHz, 1,2-tetrachloro-ethane-$d_2$) at 4.73 to 4.66 ppm. FIG. 1 shows a $^1$H NMR spectrum (400 MHz, 1,2-tetra-chloroethane-$d_2$) of an inventive high melt strength polypropylene (HMS-PP). As can be gathered from Table 3, the signal at 5.55 to 5.27 ppm can be assigned to units derivable from unsaturated acids as α-linolenic acid (LSO) and the intensity x of said signal after irradiation of a linear polypropylene in the presence of an unsaturated acid increases with the amount of said unsaturated acid added to the linear polypropylene.

The high melt strength polypropylene (HMS-PP) according to the present invention may comprise an organometallic stearate selected from magnesium stearate, aluminum stearate, sodium stearate and calcium stearate and/or at least one inorganic hydrotalcites, such as for example DHT4A. It is preferred that the high melt strength polypropylene (HMS-PP) comprises calcium stearate. The amount of the organometallic stearate and/or inorganic hydrotalcite, preferably calcium stearate, may range between 100 pp and 1000 ppm by weight, more preferably between 200 ppm and 800 ppm by weight, still more preferably preferred between 400 ppm and 600 ppm by weight, based on the overall weight of the high melt strength polypropylene (HMS-PP).

The high melt strength polypropylene (HMS-PP) according to the invention may contain further additives (AD), for instance nucleating agents and clarifiers, stabilizers, release agents, fillers, peroxides, plasticizers, anti-oxidants, lubricants, antistatics, Vitamin E, scratch resistance agents, high performance fillers, pigments and/or colorants, impact modifiers, flame retardants, blowing agents, acid scavengers, recycling additives, coupling agents, anti-microbials, anti-fogging additives, slip agents, anti-blocking additives, polymer processing aids and the like. Such additives are commercially available and for example described in "Plastic Additives Handbook", 6th edition 2009 of Hans Zweifel (pages 1141 to 1190). Preferably, the additives (AD) are selected from the group consisting of flame retardants, fillers, pigments, impact modifiers, antioxidants such as Vitamine E (α-tocopherol), nucleating agents, process stabilizers, slip agents or mixtures thereof.

Furthermore, the term "additives (AD)" according to the present invention also includes carrier materials, in particular polymeric carrier materials.

Preferably the high melt strength polypropylene (HMS-PP) of the invention does not comprise (a) further polymer(s) different to the high melt strength polypropylene (HMS-PP) in an amount exceeding 5.0 wt %, preferably in an amount exceeding 3.0 wt %, more preferably in an amount exceeding 2.0 wt %, based on the weight of the high melt strength polypropylene (HMS-PP). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the high melt strength polypropylene (HMS-PP) of the invention. The polymeric carrier material is not limited to a particular polymer. The polymeric carrier material may be ethylene homopolymer, ethylene copolymer obtained from ethylene and α-olefin comonomer such as C3 to C8 α-olefin comonomer, propylene homopolymer and/or propylene copolymer obtained from propylene and α-olefin comonomer such as ethylene and/or C4 to C8 α-olefin comonomer. It is preferred that the polymeric carrier material does not contain monomeric units derivable from styrene or derivatives thereof.

A high melt strength polypropylene is branched and, thus, differs from a linear polypropylene in that the polypropylene backbone covers side chains whereas a non-branched polypropylene, i.e. a linear polypropylene, does not cover side chains. The side chains have significant impact on the rheology of the polypropylene. Accordingly, linear polypropylenes and high melt strength polypropylenes can be clearly distinguished by their flow behavior under stress.

Stable melt strength can be defined as ratio of melt strength by Rheotens measurement according to ISO 16790:2005 at 200° C., acceleration of 120 mm/s, determined at standard shear (die pressure 30 bar) and enhanced shear (die pressure of 200 bar), being smaller than 1.3. Therefore, it is preferred that the ratio of the $F_{30}$ melt strength determined by Rheotens measurement at 200° C., acceleration of 120 mm/s bar, determined at standard shear (die pressure 30 bar), and the enhanced shear melt strength $F_{200}$ at a die pressure of 200 bar is smaller than 1.3.

Additionally or alternatively to the previous paragraph, it is preferred that the high melt strength polypropylene (HMS-PP) according to the present invention fulfills in-equation (I), more preferably in-equation (Ib), still more preferably in-equation (Ic), $$\frac{F_{30}(HMSPP) - F_{200}(HMSPP)}{F_{30}(HMSPP)} \leq 0.15 \qquad (I)$$

$$\frac{F_{30}(HMSPP) - F_{200}(HMSPP)}{F_{30}(HMSPP)} \leq 0.12 \qquad (Ia)$$

$$\frac{F_{30}(HMSPP) - F_{200}(HMSPP)}{F_{30}(HMSPP)} \leq 0.1 \qquad (Ib)$$

wherein [$F_{30}$(HMSPP)] is the $F_{30}$ melt strength of the high melt strength polypropylene (HMS-PP), determined according to ISO 16790:2005 at a die pressure of 30 bar, and [$F_{200}$(HMSPP)] is the $F_{200}$ melt strength of the high melt strength polypropylene (HMS-PP), determined according to ISO 16790:2005 at a die pressure of 200 bar.

The melt strength of linear polypropylene has an exponential dependency on the melt flow rate which makes comparisons of branched polypropylenes having different melt flow rates very difficult. The additional $F_{30}$ melt strength (AMS) of a high melt strength polypropylene can be calculated according to equation (II)

$$AMS = MS(HMNS\text{-}PP) - LMS, \quad \text{(II)}$$

wherein AMS is the additional $F_{30}$ melt strength (AMS) determined according to ISO 16790:2005 compared to the $F_{30}$ melt strength (LMS) of a linear polypropylene having the same melt flow rate $MFR_2$ (230° C., 2.16 kg) determined according to ISO 1133 as the high melt strength polypropylene (HMS-PP) in [cN], MS(HMS-PP) is the $F_{30}$ melt strength of the high melt strength polypropylene (HMS-PP) determined according to ISO 16790:2005 in [cN], LMS is the $F_{30}$ melt strength (LMS) of a linear polypropylene having the same melt flow rate $MFR_2$ (230° C., 2.16 kg) determined according to ISO 1133 as the high melt strength polypropylene (HMS-PP) in [cN], and the $F_{30}$ melt strength (LMS) of the corresponding linear polypropylene having the same melt flow rate as the high melt strength polypropylene (HMS-PP) and a polydispersity in the range of 3 to 5 is determined according to equation (III)

$$LMS = 17{,}35 \; MFR^{-0.994} \quad \text{(III)}$$

wherein MFR is the melt flow rate $MFR_2$ (230° C., 2.16 kg) determined according to ISO 1133 of the high melt strength polypropylene (HMS-PP).

It is preferred that the inventive high melt strength polypropylene (HMS-PP) has an additional $F_{30}$ melt strength (AMS) as defined above being larger than 2.0 cN (for coating grade), more preferably lager than 20 cN (for foaming grade), and a $v_{30}$ extensibility larger than 240 mm. The use of the additional $F_{30}$ melt strength (AMS) as melt flow rate normalized melt strength allows comparison between branched polypropylene (HMS-PP) products having different melt flow rates.

The crystallization temperature Tc of the high melt strength polypropylene (HMS-PP) as determined by DSC is usually smaller than the crystallization temperature Tc of the linear polypropylene precursor resin before irradiation. In particular, the high melt strength polypropylene (HMS-PP) has a crystallization temperature Tc determined according to DSC below 120° C., more preferably below 115° C.

Further, it is preferred that the high melt strength polypropylene (HMS-PP) is thermo-mechanically stable. Therefore, it is preferred that the high melt strength polypropylene (HMS-PP) has a melting temperature Tm determined according to DSC of at least 155° C., more preferably in the range of 155 to 167° C., still more preferably in the range of 157 to 163° C. like in the range of 158 to 160° C.

The high melt strength polypropylene (HMS-PP) preferably has a shear storage modulus G' tested at a frequency of 0.1 rad/s in the range of 200 to 500 Pa, more preferably in the range of 250 to 450 Pa, still more preferably in the range of 300 to 400 Pa. Furthermore, it is preferred that the crossover point where the shear storage modulus G' equals the shear loss modulus G" of the inventive high melt strength polypropylene (HMS-PP) determined by DMS at 200° C. is below 22000 Pas, more preferably below 12000 Pas, still more preferably below 10000 Pas and/or a crossover point Gc below 100 rad/s, more preferably below 70 rad/s, still more preferably below 50 rad/s.

The ratio of shear storage modulus G' and shear loss modulus G" determined by DMS at 200° C. at a frequency of 0.1 rad/s is preferably below 2.5, more preferably below 2.0, still more preferably below 1.5.

The high melt strength polypropylene (HMS-PP) preferably has a degree of shear thinning defined as the ratio between the complex viscosity $\eta^*$ at a frequency of 0.05 rad/s and the complex viscosity $\eta^*$ at a frequency of 285 rad/s of more than 30, more preferably of more than 40, wherein the complex viscosity is determined via DMS wherein for determining the DMS spectrum, an ARES G2 rheometer was used at 200° C. measuring at frequencies of 0.01 rad/s to 300 rad/s, at a linear viscoelastic strain of 5%, using plates of 0.5 mm thickness produced according to ISO 1872-2 (2007).

The xylene hot insoluble part (XHU) as determined by 5 h soxhlet extraction of the high melt strength polypropylene (HMS-PP) is preferably below 0.25 wt %

Further, it is preferred that the high melt strength polypropylene (HMS-PP) has a strain hardening coefficient as determined via extensional viscosity measurement at a temperature of 170° C. at a strain elongation rate of 1.0 s measured at 2.75 s above 8.0, more preferably equal or above 10.0. The strain hardening coefficient is an indicator for melt strength.

The present invention is further directed to a process for the preparation of a high melt strength polypropylene (HMS-PP), comprising the steps of:
  a) providing a linear propylene polymer (L-PP),
  b) blending said propylene polymer (L-PP) with a coupling agent (CA) comprising a branched unsaturated fatty acid ester, and
  c) irradiating the mixture obtained in step b) by means of electron beam irradiation.

According to step a) of the inventive process, a linear propylene polymer (L-PP) is provided as a precursor for the high melt strength polypropylene (HMS-PP).

The linear propylene polymer (L-PP) applied in the present invention may be a homopolymer or a copolymer of propylene. Polypropylene compositions consisting of a linear propylene homopolymer or a linear propylene copolymer are known. A linear propylene homopolymer is obtained by polymerizing propylene under suitable polymerization conditions. A linear propylene copolymer is obtained by copolymerizing propylene with one or more other olefins, preferably ethylene, under suitable polymerization conditions. The preparation of propylene homopolymers and copolymers is, for example, described in Moore, E. P. (996) Polypropylene Handbook. Polymerization, Characterization, Properties, Processing, Applications, Hanser Publishers; New York.

With polypropylene as used herein is meant propylene homopolymer or a copolymer of propylene with an $\alpha$-olefin, for example an $\alpha$-olefin chosen from the group of $\alpha$-olefins having 2 or 4 to 10 C-atoms, for example wherein the amount of $\alpha$-olefin is less than 10 wt % based on the total propylene copolymer.

Polypropylene and a copolymer of propylene with an $\alpha$-olefin can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems.

According to a preferred embodiment of the present invention, the linear propylene polymer (L-PP) is a linear propylene homopolymer (H-PP).

The degree of branching of the linear propylene polymer (L-PP) is preferably low, the branching index g' is preferably at least 0.95, more preferably at least 0.96, still more preferably at least 0.98, like at least 0.99. It is especially preferred that the linear propylene polymer (L-PP) has a branching index g' of 1.00.

Additionally or alternatively to the previous paragraph, it is preferred that the amount of branching in the linear propylene polymer (L-PP) is low. In particular, it is preferred that the amount of branching in the linear propylene polymer (L-PP) is in the range from 0 to 10 branches/1000 carbon atoms, more preferably in the range from 0 to 5 branches/1000 carbon atoms, still more preferably in the range from 1 to 5 branches/1000 carbon atoms.

Preferably, the linear propylene polymer (L-PP) has a melt flow rate $MFR_2$ (230° C., 2.16 kg) determined according to ISO 1133 in the range of 0.1 to 100 g/10 min, more preferably in the range of 1.0 to 100 g/10 min, still more preferably in the range of 1.0 to 25.0 g/10 min, like in the range of 1.0 to 8.0 g/10 min.

The linear propylene polymer (L-PP) can be a copolymer or a homopolymer of propylene, the latter being preferred. Moreover, the linear propylene polymer (L-PP) can comprise one or more linear propylene polymer (L-PP) components, which are different.

In case the linear propylene polymer (L-PP) is a copolymer of propylene, it is preferred that the linear propylene polymer (L-PP) has a comonomer content in the range of 0.2 to 25.0 mol %, more preferably in the range of 0.5 to 20.0 mol %, still more preferably in the range of 2.0 to 15.0 mol %, like in the range of 6.0 to 12.0 mol %.

It is preferred that the comonomer is selected from ethylene and/or C4 to $C_8$ α-olefins. It is especially preferred that the comonomer is ethylene. For linear propylene polymers (L-PP) comprising more than one, like two different propylene polymer components, which are copolymers of propylene, it is preferred that all propylene polymer components contain the same comonomer, like ethylene.

According to one embodiment of this invention, the linear propylene polymer (L-PP) is a heterophasic propylene copolymer (HECO) comprising:
  i) a matrix (M) being a polymer of propylene
  ii) an elastomer (E) being a copolymer comprising units derived from propylene and ethylene and/or $C_4$ to $C_8$ α-olefin.

Generally in the present invention, the expression "heterophasic" indicates that the elastomer is (finely) dispersed in the matrix. In other words the elastomer forms inclusion in the matrix. Thus the matrix contains (finely) dispersed inclusions being not part of the matrix and said inclusions contain the elastomer. The term "inclusion" according to this invention shall preferably indicate that the matrix and the inclusion form different phases within the heterophasic polypropylene, said inclusions are for instance visible by high resolution microscopy, like electron microscopy or scanning force microscopy.

It is appreciated that the linear propylene polymer (L-PP) being a heterophasic propylene copolymer (HECO) preferably has a rather low total comonomer content, preferably ethylene content. Thus, it is preferred that the comonomer content of the heterophasic propylene copolymer (HECO) is in the range from 4.0 to 17.0 mol %, preferably in the range from 5.0 to 14.0 mol %, more preferably in the range from 6.0 to 10.0 mol %.

Heterophasic propylene copolymers (HECO) are generally featured by a xylene cold soluble (XCS) fraction and a xylene cold insoluble (XCI) fraction. For the purpose of the present application the xylene cold soluble (XCS) fraction of the heterophasic propylene copolymers (HECO) is essentially identical with the elastomer of said heterophasic propylene copolymers (HECO).

Accordingly, when talking about the intrinsic viscosity and the ethylene content of elastomer of the heterophasic propylene copolymers (HECO), the intrinsic viscosity and the ethylene content of the xylene cold soluble (XCS) fraction of said heterophasic propylene copolymers (HECO) is meant.

Accordingly, the matrix (M) content, i.e. the xylene cold insoluble (XCI) content, in the linear propylene polymer (L-PP) being a heterophasic propylene copolymer (HECO) is preferably in the range of 75.0 to 93.0 wt %, more preferably in the range of 77.0 to 91.0 wt %, like 78.0 to 89.0 wt %.

On the other hand, the elastomer (E), i.e. the xylene cold soluble (XCS) content, in the linear propylene polymer (L-PP) being a heterophasic propylene copolymer (HECO), is preferably in the range of 7.0 to 25.0 wt %, more preferably in the range of 9.0 to 23.0 wt %, like in the range of 11.0 to 22.0 wt %.

The first component of the linear propylene polymer (L-PP) as a heterophasic propylene copolymer (HECO) is the matrix (M).

Polypropylenes suitable for use as matrix (M) may include any type of isotactic or predominantly isotactic polypropylene homopolymer or random copolymer known in the art. Thus the polypropylene may be a propylene homopolymer or an isotactic random copolymer of propylene with ethylene and/or $C_4$ to $C_8$ alpha-olefins, such as for example 1-butene, 1-hexene or 1-octene, wherein the total comonomer content ranges from 0.05 to 10 wt %.

Further and preferably, the polypropylene matrix (M) has a rather high melt flow rate. Accordingly, it is preferred that in the present invention the polypropylene matrix (M), i.e. the xylene cold insoluble (XCI) fraction of the linear propylene polymer (L-PP), has a melt flow rate $MFR_2$ (230° C., 2.16 kg) determined according to ISO1133 of in a range of 100 to 1500 g/10 min, more preferably of 120 to 800 g/10 min, still more preferably of 140 to 600 g/10 min, like in the range of 150 to 500 g/10 min.

Furthermore, the polypropylene matrix (M) can be multimodal or bimodal in view of the molecular weight.

The expression "multimodal" or "bimodal" used throughout the present invention refers to the modality of the polymer, i.e.
  the form of its molecular weight distribution curve, which is the graph of the molecular weight fraction as a function of its molecular weight, and/or
  the form of its comonomer content distribution curve, which is the graph of the comonomer content as a function of the molecular weight of the polymer fractions.

The second component of the linear propylene polymer (L-PP) as a heterophasic propylene copolymer (HECO) is the elastomer (E).

The elastomer (E) comprises, preferably consists of, units derivable from (i) propylene and (ii) ethylene and/or at least another C4 to C20 α-olefin, like C4 to C10 α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a conjugated diene, like butadiene, or a non-conjugated diene, however it is preferred that the elastomeric copolymer consists of units derivable from (i) propylene and (ii) ethylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly, the elastomer (E) comprises at least units derivable from propylene and ethylene and may comprise other units derivable from a further α-olefin as defined in the previous paragraph. However, it is in particular preferred that elastomer (E) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomer (E) is especially preferred, the latter most preferred.

Like the matrix (M), the elastomer (E) can be unimodal or multimodal, like bimodal. Concerning the definition of unimodal and multimodal, like bimodal, it is referred to the definition above.

In the present invention the content of units derivable from propylene in the elastomer (E) equates with the content of propylene detectable in the xylene cold soluble (XCS) fraction. Accordingly, the propylene detectable in the xylene cold soluble (XCS) fraction ranges from 45.0 to 75.0 wt %, more preferably 40.0 to 70.0 wt %. Thus in a specific embodiment the elastomer (E), i.e. the xylene cold soluble (XCS) fraction, comprises from 25.0 to 65.0 wt %, more preferably 30.0 to 60.0 wt %, units derivable from ethylene. Preferably the elastomer (E) is an ethylene propylene non-conjugated diene monomer polymer (EPDM) or an ethylene propylene rubber (EPR), the latter especially preferred, with a propylene and/or ethylene content as defined in this paragraph.

Additionally, it is preferred that the comonomer content, preferably ethylene content, of the xylene cold soluble (XCS) fraction of the linear propylene polymer (L-PP) being a heterophasic propylene copolymer (HECO) is equal or above 35.0 mol %, preferably in the range of 35.0 to 65.0 mol %, more preferably in the range of 45.0 to 60.0 mol.-%, yet more preferably in the range of 50.0 to 56.0 mol.-%. The comonomers present in the xylene cold soluble (XCS) fraction are those defined above for the elastomer (E). In one preferred embodiment the comonomer is ethylene only.

A further preferred requirement of the present invention is that the intrinsic viscosity (IV) of the xylene cold soluble (XCS) fraction of the linear propylene polymer (L-PP) being a heterophasic propylene copolymer (HECO) is rather low. Accordingly, it is appreciated that the intrinsic viscosity of the xylene cold soluble (XCS) fraction of the linear propylene polymer (L-PP) being a heterophasic propylene copolymer (HECO) is below 3.5 dl/g, more preferably not more than 3.4 dl/g. Even more preferred, the intrinsic viscosity of the xylene cold soluble (XCS) fraction of the linear propylene polymer (L-PP) being a heterophasic propylene copolymer (HECO) is in the range of 1.8 to 3.5 dl/g, more preferably in the range 1.9 to 3.4 dl/g, like 2.0 to 3.4 dl/g. The intrinsic viscosity is measured according to ISO 1628 in decalin at 135° C.

Preferably, the propylene content of the linear propylene polymer (L-PP) is 85.0 to 96.0 wt %, more preferably 88.0 to 94.0 wt %, based on total weight of linear propylene polymer (L-PP), more preferably based the amount of the matrix (M) and the elastomeric copolymer (E) together, in case that the linear propylene polymer (L-PP) is a heterophasic propylene copolymer (HECO) as defined above.

The linear propylene polymer (L-PP) being a heterophasic propylene copolymer (HECO) can be produced by blending the matrix (M) and the elastomer (E). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

It is preferred that the linear propylene polymer (L-PP) is prepared in the presence of:
(a) a Ziegler-Natta catalyst comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

This Ziegler-Natta catalyst can be any stereospecific Ziegler-Natta catalyst for propylene polymerization, which preferably is capable of catalyzing the polymerization and copolymerization of propylene and optional comonomers at a pressure of 500 to 10000 kPa, in particular 2500 to 8000 kPa, and at a temperature of 40 to 110° C., in particular of 60 to 110° C.

It is especially preferred that the linear propylene polymer (L-PP) is a homopolymer of propylene.

According to the present invention the expression "propylene homopolymer" relates to a polypropylene that consists substantially, i.e. of at least 99.0 wt %, more preferably of at least 99.5 wt %, still more preferably of at least 99.8 wt %, like of at least 99.9 wt %, of propylene units. In another embodiment only propylene units are detectable, i.e. only propylene has been polymerized.

Preferably the propylene polymer (PP), like the propylene homopolymer (H-PP), is isotactic. Accordingly, it is preferred that the propylene polymer (PP), like the propylene homopolymer (H-PP), has a rather high pentad concentration (mmmm %) i.e. more than 94.1%, more preferably more than 94.4%, like more than 94.4 to 98.5%, still more preferably at least 94.7%, like in the range of 94.7 to 97.5%.

According to step b) of the inventive process, the linear propylene polymer (L-PP) is blended with a coupling agent (CA) comprising a branched unsaturated fatty acid ester. The linear propylene polymer (L-PP) is preferably melt blended, for example by dry blending or by extruding, with the coupling agent (CA).

The mixture obtained in step b) of the inventive process preferably comprises 0.01 to 5.0 wt %, more preferably 0.1 to 2.0 wt %, still more preferably 0.2 to 2.0 wt %, yet more preferably 0.2 to 1.5 wt %, like 0.3 to 0.8 wt % of the coupling agent (CA) comprising a branched unsaturated fatty acid ester, based on the overall weight of the mixture obtained in step b).

Preferably, the coupling agent (CA) is a natural source of polyunsaturated unsaturated fatty acids. In particular, it is preferred that the coupling agent (CA) is linseed oil. Preferably the linseed oil is native linseed oil.

Linseed oil is distinctive for its unusually large amount of α-linolenic acid, which has a distinctive reaction with oxygen in air and therefore acts as stabilizer/radical scavenger for polypropylene and offers the combination of the highest content of polyunsaturated fatty acids with lowest level of saturation fatty acids available as commercial vegetable oils. The USFDA granted generally recognized as safe (GRAS) status for high α-linolenic flaxseed oil. Accordingly, the high melt strength polypropylene (HMS-PP) according to the present invention is suitable for the production of food containers and food-related products.

It is preferred that the mixture obtained in step b) is free of peroxides and dienes.

According to step c) of the inventive process, the mixture obtained in step b) comprising the linear propylene polymer (L-PP) and the coupling agent (CA) is irradiated by means of electron beam irradiation.

Preferably the dosage of the electron beam radiation is in the range of 50 to 150 kGy, more preferably in the range of 60 to 140 kGy, still more preferably in the range of 70 to 120 kGy, yet more preferably in the range of 90 to 120 kGy.

The mixture obtained in step b) may be irradiated in an inert or in a non-inert environment.

It is for example possible to use a reduced oxygen environment as described for example in U.S. Pat. No. 8,399,536, wherein active oxygen is in an established and maintained concentration of less than about 15% by volume, with respect to a total volume of the reduced oxygen environment. In this process the intermediate irradiated polypropylene resin is maintained in the reduced oxygen environment for a period of time sufficient for a significant amount of long chain branches to form within the intermediate irradiated polypropylene resin and the intermediate irradiated polypropylene resin is treated while the intermediate irradiated polypropylene resin is in the reduced oxygen environment to substantially deactivate all free radicals present in the intermediate irradiated polypropylene resin.

The irradiation of the mixture obtained in step b) is preferably carried out in an inert atmosphere. In particular, it is preferred that the irradiation is carried out under nitrogen.

After the irradiation step c), the mixture may be heated in order to deactivate the remaining radicals. In particular, it is preferred that the mixture obtained after step c) is heated to a temperature of 60 to 120 C, more preferably 80 to 110° C., still more preferably 90 to 100° C.

Optionally, the high melt strength polypropylene (HMS-PP) is subsequently compounded with the organometallic stearate and/or inorganic hydrotalcites and the additives (AD) as defined above.

The present invention is also directed to a blend comprising the high melt strength polypropylene (HMS-PP) as described above and one or more further polymer component. Preferably, said one or more further polymer component is one or more further polyolefin. More preferably, said one or more further polymer component is selected from the group consisting of propylene homopolymers, propylene copolymers, polyethylene homo- and copolymers and heterophasic propylene copolymers as described above.

The present invention is further directed to a high melt strength polypropylene (HMS-PP) obtained according to the process described above. Regarding the properties of the high melt strength polypropylene (HMS-PP), reference is made to the definitions provided above.

The present invention is also related to a composition (C), comprising at least 10.0 wt % of recycled high melt strength polypropylene (r-HMS-PP), being high melt strength polypropylene (HMS-PP) as described above, which is recovered from a waste plastic material derived from post-consumer and/or industrial waste.

For the purposes of the present description and of the subsequent claims, the term "recycled high melt strength polypropylene (r-HMS-PP)" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

The term "virgin", on the other hand, denotes the newly produced high melt strength polypropylene (HMS-PP) materials and/or objects prior to their first use, which have not already been recycled. The virgin high melt strength polypropylene (HMS-PP) may comprise additives which are added during or subsequently to the preparation process to increase the storage stability such as antioxidants and UV-stabilizers.

Preferably, the recycled high melt strength polypropylene (r-HMS-PP) comprises further additives which are typically added before the virgin high melt strength polypropylene (r-HMS-PP) is further processed to the final article. Thus, it is preferred that recycled high melt strength polypropylene (r-HMS-PP) comprises flame retardants, fillers, pigments, impact modifiers, antioxidants such as α-tocopherol, nucleating agents, process stabilizers, slip agents or mixtures thereof.

Typically, the virgin high melt strength polypropylene (HMS-PP) is further processed to an article which involves subjecting the high melt strength polypropylene (HMS-PP) to an extrusion processes. Without being bound to theory, the shear forces acting during an extrusion process lead to an increase of the melt flow rate of the extruded polymer. Therefore, a recycled high melt strength polypropylene (r-HMS-PP) which has been processed to an article by an extrusion process has a higher melt flow rate than the corresponding virgin high melt strength polypropylene (HMS-PP).

Accordingly, it is preferred that the melt flow rate $MFR_2$ (230° C., 2.16 kg) determined according to ISO 1133 of the recycled high melt strength polypropylene (r-HMS-PP) is higher than the melt flow rate $MFR_2$ (230° C., 2.16 kg) determined according to ISO 1133 of the originating high melt strength polypropylene (o-HMS-PP).

The term "originating" denotes the particular newly produced high melt strength polypropylene (o-HMS-PP) which was used to produce the materials contained in the post-consumer waste and industrial waste, the recycled high melt strength polypropylene (r-HMS-PP) is obtained from.

In particular, it is preferred that the melt flow rates $MFR_2$ (230° C., 2.16 kg) determined according to ISO 1133 of the recycled high melt strength polypropylene (r-HMS-PP) and the originating high melt strength polypropylene (o-HMS-PP) fulfil in-equation IV, more preferably in-equation IVa, still more preferably in-equation IVb:

$$\frac{MFR_2(oHMSPP)}{MFR_2(rHMSPP)} \leq 0.95 \qquad \text{IV}$$

$$\frac{MFR_2(oHMSPP)}{MFR_2(rHMSPP)} \leq 0.90 \qquad \text{IVa}$$

$$\frac{MFR_2(oHMSPP)}{MFR_2(rHMSPP)} \leq 0.83 \qquad \text{IVb}$$

wherein $MFR_2(oHMSPP)$ is the melt flow rate $MFR_2$ (230° C., 2.16 kg) determined according to ISO 1133 of the originating high melt strength polypropylene (o-HMS-PP) and $MFR_2(rHMSPP)$ is the melt flow rates $MFR_2$ (230° C., 2.16 kg) determined according to ISO 1133 of the recycled high melt strength polypropylene (r-HMS-PP).

The present invention also relates to foamed objects or articles which are produced using the high melt strength polypropylene (HMS-PP) according to the present invention.

The present invention is further directed to an article, comprising the high melt strength polypropylene (HMS-PP) or the composition (C) as described above. Preferably, the article comprises at least 80 wt %, more preferably at least 90 wt %, still more preferably at least 95 wt %, like at least 99 wt % of the high melt strength polypropylene (HMS-PP) or the composition (C), based on the overall weight of the article. It is especially preferred that the article consists of the high melt strength polypropylene (HMS-PP) or the composition (C).

The article is preferably a foamed article, more preferably an extrusion foam article, foam injection moulded article or pearl foam article, an injection blow moulded article or a blown film.

Preferably, the article is a foamed article, an injection blow moulded article or a blown film. It is especially preferred that the article is a foamed article such as an extrusion foam article, foam injection moulded article or particle foam article.

The high melt strength polypropylene (HMS-PP) according to the invention may be formed into foam structures by a melt processing step. Such melt processing step may be performed in melt extruder. A blowing agent may be added to the melt processing to induce the formation of foam cells. Such blowing agent may be a chemical blowing agent or a physical blowing agent. The chemical blowing agent may for example be selected from sodium hydrogen carbonate, citric acid derivatives, azodicarbonamide, hydrazodicarbonamide, 4.4'-oxybis (benzenesulfonyl hydrazide), N, N-dinitroso pentamethylene tetramine, 5-phenyltetrazole, p-Toluene sulfonyl hydrazide, and/or p-toluene sulphonylsemicarbazide. The physical blowing agent may for example be selected from nitrogen, carbon dioxide, isobutane, pentane and cyclopentane. Preferably, the blowing agent is isobutane.

The blowing agent may be introduced into the extruder at a location where the high melt strength polypropylene (HMS-PP) according to the invention is in a molten state. For example, it is preferred that the blowing agent is introduced in quantities in the range of 1.0 to 20.0 wt %, more preferably in the range of 1.5 to below 10.0 wt %, still more preferably in the range of 2.0 to 5.0 wt %, based on the overall weight of the high melt strength polypropylene (HMS-PP). The introduction of such quantities of blowing agent may contribute to the formation of a foamed structure having a desired low density in combination with a desired high fraction of closed cells. It is preferred that 2.0 to below 10.0 wt %, more preferably more than 2.0 to 5.0 wt % of isobutene, based on the overall weight of the high melt strength polypropylene (HMS-PP), is used as blowing agent.

In addition, further commonly known additives suitable for the production of foam structures from propylene-based polymer compositions may be used. For example, a quantity of a nucleating agent such as talc and/or fatty acid (bis) amides may be added. Preferably, talc is used as nucleating agent. For example, it is preferred that the nucleating agent is added in quantities of 0.1 to 2.0 wt %, more preferably 0.5 to 1.5 wt %, based on the overall weight of the high melt strength polypropylene (HMS-PP).

Also, a quantity of a cell stabilizer such as glycerol monostearate (GMS), glycerol monopalmitate (GMP), glycol di-stearate (GDS), palmitides and/or amides for example stearyl stearamide, palmitamide and/or stearamide may be added. Preferably, glycerol monostearate is used as cell stabilizer. For example, it is preferred that the cell stabilizer is added in quantities of 0.1 to 2.0 wt %, more preferably 0.5 to 1.5 wt %, based on the overall weight of the high melt strength polypropylene (HMS-PP).

The high melt strength polypropylene (HMS-PP) may subsequently be extruded from a die outlet of the melt extruder. The foam structure may thus be formed. Different material properties of the propylene-based polymer composition according to the invention and of the foam structures produced using this composition have been determined via the methods described here.

The present invention also relates to foam produced with the high melt strength polypropylene (HMS-PP) obtained with the irradiation process according to the invention.

The density of the foam structures ranges between 20 and 800 kg/m³. The density of the foam structures was determined as the apparent overall density according to ISO 845 (2006). The fraction of closed cells is preferably equal or above 90%, more preferably equal or above 98%, still more preferably above 98%. The fraction of closed cells was determined by placing a sample of the foam having a known mass and a known density as determined as the apparent overall density according to ISO 845 (2008) in a desiccator. The samples each had a length of 5 cm and a width of 3 cm. The desiccator was filled with water and a polyethylene glycol as surfactant. The pressure in the desiccator was reduced to 500 mbar. The samples were kept under these conditions for 0 min, following which the objects via a melt extrusion foaming process using a propylene-based composition produced according to the process of the invention, wherein the foamability window is equal or above 5° C., the foamability window being defined as the temperature range where foams may be produced having an apparent overall density equal or below 175 kg/m³ as determined according to ISO 845 (2006) and a closed cell content equal or above 90% when using 2.3 wt % of isobutane as blowing agent.

The invention also relates to a foamed object produced using a propylene-based composition produced according to the process of the present invention wherein the foamed object has an apparent overall density equal or below 300 kg/m³ as determined according to ISO 845 (2006) and a closed cell content equal or above 90%.

The invention will now be illustrated by the following non-limiting examples.

EXAMPLES

A. Measuring Methods

The following definitions of terms and determination methods apply for the above general description of the invention as well as to the below examples unless otherwise defined. MFR$_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimized 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$$[mmmm] \% = 100 * (mmmm/\text{sum of all pentads})$$

The presence of 2.1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2.1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2.1 erythro regio defects was quantified with respect to all propene:

$$[21e] \text{ mol } \% = 100 * (P_{21e} / p_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[mol\ \%] = 100 * fE$$

The weight percent comonomer incorporation was calculated from the mole fraction:

$$E[wt\ \%] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules (1982) 1150). This method was chosen for its robust nature and integration regions slightly adjusted to increase applicability to a wider range of comonomer contents.

Determination of Grafted Coupling Agent Concentration (α-Linolenic Acid) after Irradiation by $^1$H-NMR 1. Soxhlett Extraction to Remove Non Grafted Coupling Agent 2.5 g of the ground sample are weighed into a soxhlett sleeve. In a round flask (250 ml) 200 ml n-hexane are placed, the sleeve is inserted into the soxhlet. Extraction of non grafted coupling agent takes place under reflux cooling over a period of 24 hours. The residue is dried overnight in the vacuum drying oven at 90° C., cooled to room temperature and used for $^1$H NMR spectroscopy method.

2. $^1$H NMR Spectroscopy Method

Quantitative $^1$H NMR spectra recorded in the solution-state using a BrukerAVNEO 400 NMR spectrometer operating at 400.15 MHz. All spectra were recorded using a $^{13}$C optimised 10 mm selective excitation probe head at 125° C. using nitrogen gas for all pneumatics.

Approximately 200 mg of material was dissolved in approximately 3 ml 1,2-tetrachloro-ethane-d$_2$ (TCE-d$_2$) using approximately 3 mg of Hostanox 03 (CAS 32509-66-3) as stabiliser. Standard single-pulse excitation was employed utilising a 30 degree pulse, a relaxation delay of 3 s and 10 Hz sample rotation. A total of 64 k data points were collected per FID with a dwell time of 61 μs, corresponding to a spectral window of approximately ppm. 512 transients were acquired per spectra using 4 dummy scans. This setup was chosen for high sensitivity, resolution and stability with respect to unsaturated species. Quantitative $^1$H spectra were processed applying an exponential window function with 0.3 Hz linebroadning, integrated and relevant ratios determined from the intensities of the integrals. All chemical shifts were indirectly referenced to TMS at 0.00 ppm using the signal resulting from the residual protonated solvent at 5.95 ppm {Resconi L., Cavallo L., Fait A., Piemontesi F., Chem. Rev. 2000, 100, 1253} and the intensity of the aliphatic bulk signal (I$_{bulk}$) set to 100000. Characteristic signals at specific $^1$H NMR chemical shifts corresponding to the presence of the listed structural groups were observed which are summarized in Table 1 {Resconi L., Piemontesi F., Camurati I., Sudmeijer O., Nifantef I. E., Ivschenko P. V., Kuzmina L. G., J. Am. Soc. 1998, 120, 2308-2321}:

TABLE 1

| Characteristic $^1$H NMR signals | | |
|---|---|---|
| Structural group | Chemical shift $^1$H NMR [ppm] | Intensity |
| aliphatic bulk | 2.80-(−0.5) | y |
| terminal vinylidene | 4.73-4.66 | w |
| internal vinylidene | 4.85-4.73 | z |
| vinylene | 5.55-5.27 | x |
| allyl isobutenyl | 5.08-4.85 | v |
| hostanox | 7.00-6.81 | h |

FIG. 1 shows a typical $^1$H NMR spectrum of an inventive high melt strength polypropylene (HMS-PP).

Ratios between intensities of specific groups were calculated compensating for influences of other groups:

$$\text{ratio } x/z = x/(z - w)$$

$$\text{ratio } x/y = x/(y - (h/4 * 42))$$

Melting Temperature Tm, Crystallization Temperature Tc and Melting Enthalpy Hm

The melting temperature, Tm, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The crystallization temperature (Tc) is determined from the cooling step while melting temperature (Tm) and melting enthalpy (Hm) are being determined in the second heating step.

$F_{30}$ and $F_{200}$ Melt Strength and $v_{30}$ and $v_{200}$ Melt Extensibility The test described herein follows ISO 16790:2005. The strain hardening behaviour is determined by the method as described in the article "Rheotens-Mastercurves and Drawability of Polymer Melts", M. H. Wagner, Polymer Engineering and Science, Vol. 36, pages 925 to 935. The strain hardening behaviour of polymers is analysed by Rheotens apparatus (product of Gdttfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). For measuring $F_{30}$ melt strength and v30 melt extensibility, the pressure at the extruder exit (=gear pump entry) is set to 30 bars by by-passing a part of the extruded polymer. For measuring $F_{200}$ melt strength and v200 melt extensibility, the pressure at the extruder exit (=gear pump entry) is set to 200 bars by by-passing a part of the extruded polymer. The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed), where the polymer strand ruptures, are taken as the $F_{30}$ melt strength and $v_{30}$ melt extensibilty values, or the $F_{200}$ melt strength and $v_{200}$ melt extensibilty values, respectively.

The additional melt strength (AMS) is calculated according to equation (II)

$$AMS = MS(HMS - PP) - LMS, \quad (II)$$

wherein AMS is the additional $F_{30}$ melt strength (AMS) determined according to ISO 16790:2005 compared to the $F_{30}$ melt strength (LMS) of a linear polypropylene having the same melt flow rate MFR$_2$ (230° C., 2.16 kg) determined according to ISO 1133 as the high melt strength polypropylene (HMS-PP) in [cN], MS(HMS-PP) is the $F_{30}$ melt strength of the high melt strength polypropylene (HMS-PP) determined according to ISO 16790:2005 in [cN], LMS is the $F_{30}$ melt strength (LMS) of a linear polypropylene having the same melt flow rate MFR$_2$ (230° C., 2.16 kg) determined according to ISO 1133 as the high melt strength polypropylene (HMS-PP) in [cN], and the $F_{30}$ melt strength (LMS) of the corresponding linear polypropylene having the same melt flow rate as the high melt strength polypropylene (HMS-PP) and a polydispersity in the range of 3 to 5 is determined according to equation (III)

$$LMS = 17.35 \; MFR^{-0.994}, \quad (III)$$

wherein MFR is the melt flow rate MFR$_2$ (230° C., 2.16 kg) determined according to ISO 1133 of the high melt strength polypropylene (HMS-PP).

Equation (III) is the fitting function of the melt flow rate MFR$_2$ (230° C., 2.16 kg) determined according to ISO 1133 and the $F_{30}$ melt strength as defined above of commercial linear propylene homopolymers tested by the Rheotens. The melt flow rates and $F_{30}$ melt strength of said commercial linear propylene homopolymers from Borealis are summarized in Table 2.

TABLE 2

$F_{30}$ melt strength as a function of the melt flow rate

| Commercial linear PP | MFR [g/10 min] | $F_{30}$ melt strength [cN] |
|---|---|---|
| BA390 | 0.2 | 87 |
| BE50 | 0.3 | 60 |
| HA001 | 0.5 | 35 |
| HA507 | 0.9 | 17 |
| HB600TF | 2.0 | 9 |
| HC205TF | 5.0 | 3.5 |
| HD120MO | 10.0 | 1.8 |

The Branching Index g'

The relative amount of branching is determined using the g'-index of the branched polymer sample. The long chain branching (LCB) index is defined as $g'=[\eta]_{br}/[\eta]_{lin}$. It is well known if the g' value increases the branching content decreases. [η] is the intrinsic viscosity at 160° C. in TCB of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector. $[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_0^i a_i * \frac{[\eta]_{br,i}}{[\eta]_{lin,i}}}{\sum a_i}$$

Where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and a values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^\alpha$. $[\eta]_{br,i}$ was measured for each particular sample by online viscosity and concentration detector.

gpcBR Index:

The gpcBR index is calculated by using the following formula:

$$gpc_{BR} = \left[\left(\frac{[\eta]_{lin}}{[\eta](bulk)}\right)\right] \cdot \left[\frac{M_w(LS15)}{M_{w,lin}}\right]^\alpha - 1$$

Where the Mw (LS15) is calculated from the light scattering elution area of 150 angle and [η] (bulk) from the corresponded viscosity detector elution area by using the Cirrus Multi-Offline SEC-Software Version 3.2 and the following approach.

$$M_w(LS15) = \frac{K_{LS} \cdot \text{Area}_{LS15-det}}{\frac{dn}{dc} \cdot \text{Area}_{RI-det}}$$

-continued $$[\eta](\text{bulk}) = K_{IV} \cdot \frac{\sum nSp_i}{C} (\text{dl/g})$$

Where $K_{LS}$ is the light scattering constant of 150 angle, dn/dc is the refractive index increment as calculated from the detector constant of the RI detector, $K_{IV}$ is the detector constant of the viscometer, $Sp_i$ is the specific viscosity at each chromatographic slice and C is the corresponded concentration in g/dl.

Shear Thinning Index SHI

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 200° applying a frequency range between 0.01 and 300 rad/s and setting a gap of 0.5 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0} \cos\delta \, [\text{Pa}] \quad (3)$$

$$G'' = \frac{\sigma_0}{\gamma_0} \sin\delta \, [\text{Pa}] \quad (4)$$

$$G^* = G' + iG'' \, [\text{Pa}] \quad (5)$$

$$\eta^* = \eta' - i\eta'' \, [\text{Pa} \cdot \text{s}] \quad (6)$$

$$\eta' = \frac{G''}{\omega} \, [\text{Pa} \cdot \text{s}] \quad (7)$$

$$\eta'' = \frac{G'}{\omega} \, [\text{Pa} \cdot \text{s}] \quad (8)$$

The determination of so-called Shear Thinning Index, which correlates with MWD and is independent of Mw, is done as described in equation 9.

$$SHI_{(x/y)} = \frac{Eta*\text{at } 0.05 \text{ rad/s}}{Eta*\text{fat } 285 \text{ rad/s}} \quad (9)$$

For example, the $SHI_{(0.05/2285)}$ is defined by the value of the complex viscosity, in Pa s, determined at a frequency of 0.05 rad/s, divided by the value of the complex viscosity, in Pa s, determined at a frequency of 285 rad/s.

The values of storage modulus (G'), loss modulus (G"), complex modulus (G*) and complex viscosity (η*) were obtained as a function of frequency (ω).

Thereby, e.g. $\eta^*_{300rad/s}$ ($eta^*_{300rad/s}$) is used as abbreviation for the complex viscosity at the frequency of 285 rad/s and $\eta^*_{0.05rad/s}$ ($eta^*_{0.05rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s. The elasticity balance $\tan_{0.05}/\tan_{300}$ is defined as the ratio of the loss tangent $\tan_{0.05}$ and the loss tangent $\tan_{300}$.

The polydispersity index, PI, is defined by equation 10.

$$PI = \frac{10^5}{G'(\omega_{COP})}, \quad (10)$$

$$\omega_{COP} = \omega \text{ for } (G' = G'')$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

The xylene hot insoluble (XHU) fraction is determined according to EN 579. About 2.0 g of the polymer ($m_p$) are weighted and put in a mesh of metal which is weighted, the total weight being represented by ($m_{p+m}$). The polymer in the mesh is extracted in a soxhlet apparatus with boiling xylene for 5 hours. The eluent is then replaced by fresh xylene and boiling is continued for another hour. Subsequently, the mesh is dried and weighted again (m×Hu+m). The mass of the xylene hot insoluble (m×Hu) obtained by the formula m×Hu+m−m$_m$=m×Hu is put in relation to the weight of the polymer (m$_p$) to obtain the fraction of xylene insolubles m×Hu/m$_p$.

B. Examples

Inventive examples IE1 to IE7 and comparative examples CE1, CE2 and CE2a were prepared as follows:

As a linear precursor, the linear polypropylene homopolymer HA001 of Borealis is used, having MFR of 0.6 g/10 min (230° C., 2.16 kg/cm$^2$; ISO 1133), a melting point of 161° C., a crystallization temperature of 116° C., having an isotacticity of 97.3% (pentad concentration by $^{13}$C NMR) produced by slurry process using a Ziegler-Natta catalyst. The F30 melt strength of the stabilized powder is 35 cN.

The linseed oil was purchased from Lausitzer Ölmühle Hoyerswerda GmbH and is cold-pressed linseed oil comprising 99 g fats, 23 g monounsaturated fatty acids, 60 g poly-unsaturated fatty acids, 15 g saturated fatty acids and 0.22 g protein per 100 mL.

The propylene homopolymer fluff HA001 of Borealis was compounded into pellets on a Prism TSE 24MC under nitrogen with the linseed oil in amounts as indicated in Table 4 (examples P0 to P4). The throughput was 10 kg/h. The additives were dosed via a pre-blend or direct dosing to the extruder. The temperature setting of the extruder was between 20° C. and 240° C. The thus obtained pellets were irradiated as follows:

The E Beam irradiation process was performed in three steps:

Radiation of granulate with a dose of 80-110 kGy, 10 MeV at 20° C. in inert atmosphere, belt speed 50 mm/s, belt width 800 mm, bed height of irradiated sample 50 mm.

Heating of the radiated granulate for 30 minutes at 60° C. in inert atmosphere.

De-activating the radicals by heating 30 minutes at 100° C. in inert atmosphere

The concentration of the grafted coupling agent was determined by $^1$H NMR spectroscopy as described above. The results are summarized in Table 3.

The properties of the obtained inventive and comparative polypropylenes are summarized in Table 4.

Further, the following commercial polymers were used as comparative examples:

CE3 is the commercial HMS-PP PF814 of LyondellBasell
CE4 is the commercial HMS-PP WB140HMS of Borealis As can be gathered from Table 4, the rheological properties of the high melt strength polypropylene (HMS-PP) according to the present invention are comparable with the properties of comparative examples CE3 and CE4 being high melt strength polypropylenes prepared with a peroxide as radical source and butadiene as coupling agent. Table 4 also shows that the ratio between the F$_{30}$ melt strength and the F$_{200}$ melt strength is stable for the inventive examples which indicates that the inventive high melt strength polypropylene can be re-extrudated without deterioration of the rheological properties. Further, no nucleation effects occur since the crystallization temperature Tc remains on the same level compared to the linear precursor (HA001).

Examples IE2, IE5, IE6, and IE7 are all based on the same linear polypropylene homopolymer HA001, to which 0.5 wt % of the same coupling agent was added and was irradiated with the same dose. Nevertheless, the properties are slightly different. This deviation is a normal behavior.

A very desirable value of the F$_{30}$ melt strength of the high melt strength polypropylene (HMS-PP) is close to 30 cN or more preferably at least 30 cN. The important fact is that all inventive examples achieve this goal even if there is some variation of the properties despite partly the same conditions as mentioned above.

As indicated already above, the variation of properties is normal. After the step of irradiation, the high melt strength polypropylene still contains some radicals. These radicals further react when the sample of the high melt strength polypropylene is transported to the step of measurement of a particular property, e.g. MFR or melt strength. In the examples disclosed herein, care has been taken to bring the sample rather quickly to the respective measurement step. Nevertheless, one cannot guarantee achieving always the same conditions if it comes to time span, temperature, and concentration of coupling agent. Minor deviations in conditions may cause measurable differences in properties.

Inventive Examples IE8 to IE13 were prepared in the same manner as inventive examples IE1 to IE7 except for the coupling agent used. Table 5 indicates the type and amount of coupling agent added and the corresponding results.

Walnut oil is Walnußöl from Aromatika BV, Netherlands, containing 9.8 wt % saturated fat.

Tung oil is Allendo® from Bindulin Werk, CAS Nr. 8001-20-5.

Sunflower oil is Osolio from Spar containing 10 wt % saturated fat.

All these three oils were purchased from a regular supermarkets in Linz, Austria.

TABLE 3

Determination of grafted coupling agent concentration (α-linolenic acid) by $^1$H-NMR

| | structural group | | | | | | | |
|---|---|---|---|---|---|---|---|---|
| | aliphatic bulk | terminal vinylidene | internal vinylidene | vinylene | ally isobutenyl | hostanox | | ratio |
| | chemical shift $^1$H NMR [ppm] | | | | | | | |
| | 2.80-(−0.5) | 4.73-4.66 | 4.85-4.73 | 5.55-5.27 | 5.08-4.85 | 7.00-6.81 | ratio x/z = x/ | x/y = x/ (y − |
| | intensity | | | | | | | (h/4*42)) |
| material | y | w | z | x | v | h | (z − w) | |
| HA001 | 100000 | 0.61 | 0.67 | 0.00 | 0.00 | 49.88 | 0.00 | 0.00E+00 |
| LSO | 100000 | 0.00 | 0.00 | 16100.00 | 0.00 | | 589.33 | 1.61E−01 |
| P1 | 100000 | 0.61 | 0.67 | 35.36 | 0.00 | 51.49 | 589.33 | 3.56E−04 |
| P2 | 100000 | 0.76 | 0.79 | 18.09 | 0.00 | 51.4 | 603.00 | 1.82E−04 |

TABLE 3-continued

Determination of grafted coupling agent concentration (α-linolenic acid) by $^1$H-NMR

| | structural group | | | | | | | |
|---|---|---|---|---|---|---|---|---|
| | aliphatic bulk | terminal vinylidene | internal vinylidene | vinylene | allyl isobutenyl | hostanox | | ratio |
| | | | chemical shift $^1$H NMR [ppm] | | | | ratio x/z = x/ | x/y = x/ (y − |
| | 2.80-(−0.5) | 4.73-4.66 | 4.85-4.73 | 5.55-5.27 | 5.08-4.85 | 7.00-6.81 | | |
| material | y | w | z | x | v | h | (z − w) | (h/4*42)) |
| P3 | 100000 | 1.04 | 1.06 | 5.96 | 0.00 | 44.33 | 298.00 | 5.99E−05 |
| HA001 irradiated | 100000 | 1.83 | 17.43 | 3.72 | 13.83 | 53.29 | 0.24 | 3.74E−05 |
| CE3 | 100000 | 2.79 | 15.95 | 2.98 | 13.75 | 48.16 | 0.23 | 3.00E−05 |
| P1 irradiated | 100000 | 0.48 | 13.53 | 8.33 | 10.38 | 42.16 | 0.64 | 8.37E−05 |
| P1 irradiated insoluble | 100000 | 0.70 | 14.22 | 8.03 | 10.72 | 47.18 | 0.59 | 8.07E−05 |
| P2 irradiated | 100000 | 1.10 | 16.32 | 5.76 | 12.49 | 47.56 | 0.38 | 5.79E−05 |
| P2 irradiated insoluble | 100000 | 1.00 | 16.39 | 5.48 | 12.22 | 50.49 | 0.36 | 5.51E−05 |
| P3 irradiated | 100000 | 1.34 | 17.92 | 4.65 | 13.30 | 55.45 | 0.28 | 4.68E−05 |
| P3 irradiated insoluble | 100000 | 1.16 | 17.40 | 4.16 | 12.89 | 44.79 | 0.26 | 4.18E−05 |

TABLE 4

Properties of inventive and comparative examples

| Example | Dose [kGy] | Coupling agent [wt %] | MFR [g/10 min] | SHI ETA 0.05/285 [−] | Crossover point [rad/s] | Crossover point Gc [kPa] | PI [Pa−1] | Eta .0.05 [Pa s] | Eta 285 [Pa s] | tand at 0.1 rad/s | $F_{30}$ melt strength [cN] | $F_{30}$ AMS [cN] | $F_{200}$ melt strength [cN] | $(F_{30} − F_{200})/F_{30}$ [%] | Tm [° C.] | Tc [° C.] |
|---|---|---|---|---|---|---|---|---|---|---|---|---|---|---|---|---|
| HA001 | 0 | 0 | 0.6 | | | | | | | | | | | | 163 | 113 |
| P0 | 0 | 0 | 2.4 | | | | | | | | | | | | 161 | 116 |
| P1 | 0 | 0.5 | 1.1 | | | | | | | | | | | | 163 | 113 |
| P2 | 0 | 0.25 | 1.1 | | | | | | | | | | | | 163 | 115 |
| P3 | 0 | 0.1 | 1.2 | | | | | | | | | | | | 161 | 115 |
| P4 | 0 | 0.05 | 1.2 | | | | | | | | | | | | 161 | 116 |
| IE1 | 80 | 0.5 | 11.3 | 27.5 | 126 | 20675 | 4.8 | 4257 | 154.9 | 3.3 | 19.0 | 17.4 | | | 157 | 113 |
| IE2 | 110 | 0.5 | 2.3 | 53.1 | 37 | 8624 | 11.6 | 6262.4 | 118.0 | 1.6 | 37.4 | 37.1 | | | 157 | 112 |
| IE3 | 110 | 0.25 | 3.8 | 40.0 | 92.9 | 11991 | 8.3 | 4223 | 105.5 | 2.1 | 35.1 | 34.7 | | | 155 | 114 |
| IE4 | 110 | 0.1 | 7.0 | 33.0 | 163 | 16582 | 6.0 | 3610.4 | 109.5 | 2.7 | 28.0 | 27.5 | | | 154 | 114 |
| IE5 | 110 | 0.5 | 3.1 | 46.9 | 74.2 | 11056 | 9.0 | 5043.7 | 107.6 | 1.7 | 36.1 | 30.5 | 34.7 | 4% | 157 | 113 |
| IE6 | 110 | 0.5 | 3.4 | 44.9 | 65.7 | 11633 | 8.6 | 5400.3 | 120.4 | 1.8 | 37.7 | 32.5 | 34.9 | 8% | 157 | 113 |
| IE7 | 110 | 0.5 | 3.6 | 44.4 | 113 | 12686 | 7.9 | 4467.5 | 100.6 | 1.8 | 35.2 | 30.4 | 34.6 | 2% | 157 | 113 |
| CE1 | 60 | 0 | 5.0 | 38.7 | 40 | 16503 | 6.1 | 7890.2 | 203.9 | 2.1 | | | | | | |
| CE2 | 80 | 0 | 11.2 | 26.5 | 80 | 19916 | 5.0 | 4159.4 | 150.0 | 2.1 | | | | | | |
| CE2a | 110 | 0 | 5.3 | 36.8 | 90.9 | 13749 | 7.3 | 4469.9 | 121.6 | 2.1 | | | | | | |
| CE3 | nd | nd | 2.5 | 40.0 | 14 | 8500 | 11.8 | 8000 | 200.0 | 1.8 | 35.0 | 28.0 | 28 | 25% | 159 | 125 |
| CE4 | 0 | nd | 2.0 | 62.5 | 2 | 8000 | 12.5 | 10000 | 160.0 | 1.4 | 36.0 | 27.3 | 30 | 20% | 160 | 129 |

TABLE 5

Properties of inventive and comparative examples

| Example | Dose [kGy] | Coupling agent | Coupling agent [wt %] | MFR [g/10 min] | SHI ETA 0.05/285 [—] | Crossover point [rad/s] | Crossover point Gc [kPa] | PI [Pa−1] | Eta .0.05 [Pa s] |
|---|---|---|---|---|---|---|---|---|---|
| HA001 | 0 | — | 0 | 0.6 | | | | | |
| P0 | 0 | — | 0 | 2.4 | | | | | |
| P1 | 0 | Linseed oil | 0.5 | 1.1 | | | | | |
| P2 | 0 | Linseed oil | 0.25 | 1.1 | | | | | |
| P3 | 0 | Linseed oil | 0.1 | 1.2 | | | | | |
| P4 | 0 | Linseed oil | 0.05 | 1.2 | | | | | |
| IE3 | 110 | Linseed oil | 0.25 | 3.8 | 40.0 | 92.9 | 11991 | 8.3 | 4223 |
| IE8 | 110 | Walnut oil | 0.25 | 4.3 | 58.7 | 11.1 | 6996.3 | 14.3 | 9313.4 |

TABLE 5-continued

Properties of inventive and comparative examples

| | | | | | | | | | |
|---|---|---|---|---|---|---|---|---|---|
| IE9  | 110 | Tung oil      | 0.25 | 1.4  | 75.7 | 3.0  | 3847.9 | 26.0 | 11987.0 |
| IE10 | 110 | Sunflower oil | 0.25 | 7.1  | 83.2 | 2.2  | 3472.5 | 28.8 | 13281.0 |
| IE11 | 90  | Walnut oil    | 0.25 | 2.9  | 55.2 | 13.1 | 8277.8 | 12.1 | 9374.7  |
| IE12 | 90  | Tung oil      | 0.25 | 0.8  | 88.9 | 1.3  | 3632.5 | 27.5 | 18421.0 |
| IE13 | 90  | Sunflower oil | 0.25 | 4.5  | 59.2 | 10.7 | 8194.8 | 12.2 | 11046.0 |
| CE1  | 60  | —             | 0    | 5.0  | 38.7 | 40   | 16503  | 6.1  | 7890.2  |
| CE2  | 80  | —             | 0    | 11.2 | 26.5 | 80   | 19916  | 5.0  | 4159.4  |
| CE2a | 110 | —             | 0    | 5.3  | 36.8 | 90.9 | 13749  | 7.3  | 4469.9  |
| CE3  | nd  |               | nd   | 2.5  | 40.0 | 14   | 8500   | 11.8 | 8000    |
| CE4  | 0   |               | nd   | 2.0  | 62.5 | 2    | 8000   | 12.5 | 10000   |

| Example | Eta 285 [Pa s] | tand at 0.1 rad/s | $F_{30}$ melt strength [cN] | $F_{30}$ AMS [cN] | $F_{200}$ melt strength [cN] | $(F_{30}-F_{200})/F_{30}$ [%] | Tm [°C.] | Tc [°C.] |
|---|---|---|---|---|---|---|---|---|
| HA001 |       |     |      |      |      |     | 163 | 113 |
| P0    |       |     |      |      |      |     | 161 | 116 |
| P1    |       |     |      |      |      |     | 163 | 113 |
| P2    |       |     |      |      |      |     | 163 | 115 |
| P3    |       |     |      |      |      |     | 161 | 115 |
| P4    |       |     |      |      |      |     | 161 | 116 |
| IE3   | 105.5 | 2.1 | 35.1 | 34.7 |      |     | 155 | 114 |
| IE8   | 158.8 | 1.6 | 30.7 | 26.6 | 26.5 | 14% | 158 | 123 |
| IE9   | 158.4 | 1.3 | 35.5 | 23.3 | 31.6 | 11% | 158 | 125 |
| IE10  | 159.6 | 1.2 | 27.5 | 25.0 | 23.4 | 15% | 158 | 123 |
| IE11  | 169.8 | 1.8 | 28.0 | 22.0 | 25.5 | 9%  | nd  | nd  |
| IE12  | 207.2 | 1.2 | 35.2 | 14.6 | 34.6 | 2%  | nd  | nd  |
| IE13  | 186.5 | 1.6 | 25.5 | 21.6 | 22.5 | 12% | nd  | nd  |
| CE1   | 203.9 | 2.1 |      |      |      |     |     |     |
| CE2   | 150.0 | 2.7 |      |      |      |     |     |     |
| CE2a  | 121.6 | 2.1 |      |      |      |     |     |     |
| CE3   | 200.0 | 1.8 | 35.0 | 28.0 | 28   | 25% | 159 | 125 |
| CE4   | 160.0 | 1.4 | 36.0 | 27.3 | 30   | 20% | 160 | 129 |

The invention claimed is:

1. A high melt strength polypropylene (HMS-PP), having a branching index g' determined by GPC below 0.9 and comprising units derivable from:
   i) propylene, and
   ii) at least one polyunsaturated fatty acid,
   wherein the high melt strength polypropylene (HMS-PP) comprises 0.05 to 2.0 wt % of units derivable from at least one polyunsaturated fatty acid based on the overall weight of the high melt strength polypropylene (HMS-PP).

2. The high melt strength polypropylene (HMS-PP) according to claim 1, wherein the at least one polyunsaturated fatty acid is linoleic acid and/or α-linolenic acid.

3. The high melt strength polypropylene (HMS-PP) according to claim 1, wherein the ratio x/(z−w) is in the range of 0.25 to 2.0, wherein x is the intensity of the $^1$H NMR signal (400 MHZ, 1,2-tetrachloroethane-d$_2$) at 5.55 to 5.27 ppm, z is the intensity of the $^1$H NMR signal (400 MHZ, 1,2-tetrachloroethane-d$_2$) at 4.85 to 4.73 ppm and w is the intensity of the $^1$H NMR signal (400 MHZ, 1,2-tetrachloroethane-d$_2$) at 4.73 to 4.66 ppm.

4. The high melt strength polypropylene (HMS-PP) according to claim 1, fulfilling in-equation (I):

$$\frac{F_{30}(HMSPP) - F_{200}(HMSPP)}{F_{30}(HMSPP)} \leq 0.15 \tag{I}$$

wherein [$F_{30}$(HMSPP)] is the $F_{30}$ melt strength of the high melt strength polypropylene (HMS-PP) determined according to ISO 16790:2005 at 30 bar and [$F_{200}$(HMSPP)] is the $F_{200}$ melt strength of the high melt strength polypropylene (HMS-PP) determined according to ISO 16790:2005 at 200 bar.

5. The high melt strength polypropylene (HMS-PP) according to claim 1, wherein the high melt strength polypropylene (HMS-PP) has an additional $F_{30}$ melt strength (AMS), determined according to ISO 16790:2005, compared to the $F_{30}$ melt strength (LMS) of a linear polypropylene having the same melt flow rate MFR$_2$, determined at 230° C. and a load of 2.16 kg according to ISO 1133, as the high melt strength polypropylene (HMS-PP), of above 2.0 cN, wherein the additional $F_{30}$ melt strength (AMS) is determined according to equation (II):

$$AMS = MS(HMS-PP) - LMS, \tag{II}$$

wherein AMS is the additional $F_{30}$ melt strength (AMS), determined according to ISO 16790:2005, compared to the $F_{30}$ melt strength (LMS) of a linear polypropylene having the same melt flow rate MFR$_2$, determined at 230° C. at a load of 2.16 kg according to ISO 1133, as the high melt strength polypropylene (HMS-PP) in [cN], MS (HMS-PP) is the $F_{30}$ melt strength of the high melt strength polypropylene (HMS-PP), determined according to ISO 16790:2005 in [cN], LMS is the $F_{30}$ melt strength (LMS) of a linear polypropylene having the same melt flow rate MFR$_2$, determined at 230° C. at a load of 2.16 kg according to ISO 1133, as the high melt strength polypropylene (HMS-PP) in [cN], and wherein the $F_{30}$ melt strength (LMS) is determined according to equation (III):

$$LMS = 17.35 \, MFR^{-0.994}, \tag{III}$$

wherein MFR is the melt flow rate MFR$_2$, determined at 230° C. at a load of 2.16 kg according to ISO 1133, of the high melt strength polypropylene (HMS-PP).

6. The high melt strength polypropylene (HMS-PP) according to claim 1, having a crystallization temperature Tc determined according to DSC below 120° C.

7. A process for the preparation of a high melt strength polypropylene (HMS-PP), comprising the steps of:
 a) providing a linear propylene polymer (L-PP),
 b) blending said propylene polymer (L-PP) with a coupling agent (CA) comprising a polyunsaturated fatty acid, and
 c) irradiating the mixture obtained in step b) by means of electron beam irradiation,
 wherein the mixture obtained in step b) comprises 0.1 to 2.0 wt % of the coupling agent (CA) comprising a polyunsaturated fatty acid, based on the overall weight of the mixture obtained in step b).

8. The process according to claim 7, wherein the dosage of the electron beam radiation according to step c) is in the range of 50 to 150 kGy.

9. The process according to claim 7, wherein the coupling agent (CA) comprising a polyunsaturated fatty acid is native linseed oil.

10. A composition (C) comprising at least 10.0 wt %, based on the overall weight of the composition (C), of recycled high melt strength polypropylene (r-HMS-PP), being high melt strength polypropylene (HMS-PP) according to claim 1, which is recovered from a waste plastic material derived from post-consumer and/or industrial waste.

11. The composition (C) according to claim 10, wherein the melt flow rates MFR$_2$, determined at 230° C. at a load of 2.16 kg according to ISO 1133, of the recycled high melt strength polypropylene (r-HMS-PP) and of the originating high melt strength polypropylene (o-HMS-PP), being the high melt strength polypropylene, the recycled high melt strength polypropylene (r-HMS-PP) is obtained from, fulfil in-equation IV:

$$\frac{MFR_2(oHMSPP)}{MFR_2(rHMSPP)} \leq 0.95 \qquad \text{IV}$$

wherein MFR$_2$ (OHMSPP) is the melt flow rate MFR$_2$, determined at 230° C. at a load of 2.16 kg according to ISO 1133, of the originating high melt strength polypropylene (o-HMS-PP) and MFR$_2$ (rHMSPP) is the melt flow rate MFR$_2$, determined at 230° C. at a load of 2.16 kg according to ISO 1133, of the recycled high melt strength polypropylene (r-HMS-PP).

12. The composition (C) according to claim 10, comprising additives (AD) selected from the group consisting of flame retardants, fillers, pigments, impact modifiers, antioxidants, nucleating agent, process stabilizers, slip agents, or mixtures thereof.

13. An article comprising the high melt strength polypropylene (HMS-PP) according to claim 1 or the composition (C) according to claim 10.

* * * * *